United States Patent

Gremillion et al.

[11] Patent Number: 5,984,032
[45] Date of Patent: Nov. 16, 1999

[54] ARTICULATING MARSH BUGGY

[76] Inventors: Ernest J. Gremillion, 118 W. 75th, Cut Off, La. 70345; Steven M. Gremillion, P.O. Box 1078 (1817 Hwy. 24), Larose, La. 70373

[21] Appl. No.: 09/095,097

[22] Filed: Jun. 10, 1998

[51] Int. Cl.⁶ ............................. B60D 7/14; B62D 55/00
[52] U.S. Cl. ............................................ 180/14.1; 180/9.1
[58] Field of Search .................................. 180/9.1, 9.44, 180/9.46, 14.1

[56] References Cited

U.S. PATENT DOCUMENTS

| | | | |
|---|---|---|---|
| 3,435,908 | 4/1969 | Sunderlin et al. | 180/9.44 |
| 3,443,654 | 5/1969 | Schoonover | 180/9.62 |
| 3,451,494 | 6/1969 | Kowalik | 180/9.24 |
| 3,789,942 | 2/1974 | Kowalik | 180/9.44 |
| 3,937,289 | 2/1976 | Dickinson | 180/9.44 |
| 3,951,093 | 4/1976 | Poche | 115/270 |
| 4,072,203 | 2/1978 | Pierson | 180/9.44 |
| 4,174,757 | 11/1979 | Stedman | 172/292 |
| 4,645,023 | 2/1987 | Rea et al. | 180/9.32 |
| 4,961,395 | 10/1990 | Coast | 114/270 |
| 4,966,242 | 10/1990 | Baillargeon | 180/9.44 |
| 5,113,958 | 5/1992 | Holden | 180/9.4 |
| 5,511,508 | 4/1996 | Wilson, Sr. et al. | 114/356 |

*Primary Examiner*—Kevin Hurley
*Assistant Examiner*—Faye M. Fleming
*Attorney, Agent, or Firm*—Jacobson, Price, Holman & Stern, PLLC

[57] ABSTRACT

An articulating marsh buggy or vehicle in the form of an articulated amphibious vehicle incorporating a front and rear drive unit which are pivotally connected for relative angular movement about a generally vertical axis and oscillatable about a generally longitudinal axis. Each of the units includes a pair of pivotal floatable pontoons with each pontoon including a drive chain on which elongated cleats are transversely mounted. The drive chains are driven by independent hydraulic motors to enable the vehicle to move over various terrains and be propelled in marshy areas, bayous or water bodies by cleats on the driven chains on the pontoons.

20 Claims, 5 Drawing Sheets

ARTICULATING MARSH BUGGY

BACKGROUND OF THE INVENTION

1. Field of the Invention

The present invention relates to an articulating marsh buggy in the form of an amphibious vehicle incorporating forward and rear drive units which are pivotally connected for relative angular movement about a vertical axis and oscillatable about a longitudinal axis. Each of the drive units includes a pair of pivotal, floatable pontoons with each pontoon including a drive chain on which cleats are mounted. The drive chains are driven by independent motors to enable the vehicle to move over various ground terrains and be propelled in marshy areas, bayous or water bodies by cleats on the driven chains on the pontoons.

2. Description of the Prior Art

Amphibious marsh buggies or vehicles were first developed about 50 years ago. One use of these vehicles was to support oil and gas exploration. The vehicles originally developed for this task were equipped with four large wheels and two engines. These wheels were designed with deep lugged cleats for traction and built of light weight steel for durability and buoyancy. The drive engines were installed on the right and left sides of the vehicles' main frame. Each engine powered the two wheels on their respective sides. Steering or turning was achieved by increasing and/or decreasing engine speeds which in turn controlled wheel revolutions and made turning possible. For example, if the driver was required to turn the vehicle to the right, this was accomplished by increasing engine and wheel RPMs on the left side and vice versa to turn left.

A short time after these vehicles were put into service it was determined that their environmental impact was so destructive that they were banned. This led to the development of a second generation vehicle which incorporated the use of pontoons and a track drive system. Each unit was configured with two longitudinal side pontoons which provided the required buoyancy and a continuous drive track around each pontoon provided drive power. Channel type cleats were provided on the drive tracks for traction, with both tracks being driven by a single engine. This track drive system also incorporated a unique braking system to control steering. This type of steering system requires the driver to lock or stop the track movement on one side while allowing the other side to continue pulling. This concept is similar to the steering system used on bulldozers and cranes.

As with all vehicles equipped with this type steering system, when turning right for instance, it is necessary to lock or stop track movement on the right side while pulling with the left side. Therefore, in order to turn it is necessary to develop sufficient pulling force and traction on one side to overcome not only the weight of the unit, but also the drag resistance of the locked tracks on the opposite side. When this turning or "skidding" method is used in ecologically sensitive areas, where tender vegetation and loose root structure exist, the results are disastrous. These units, designed and built in the 1960's, have undergone little improvement to date and are still the primary means of support utilized by the oil and gas industry.

The following U.S. patents may be pertinent to the vehicle of the present invention:

| | | |
|---|---|---|
| 3,435,908 | 3,789,942 | 4,174,757 |
| 3,443,654 | 3,937,289 | 4,645,023 |
| 3,451,494 | 4,072,203 | 4,966,242 |

However, the above patents do not disclose the structural arrangement and operational characteristics of the present invention.

SUMMARY OF THE INVENTION

The present day greater awareness of environmental concerns and ongoing oil and gas exploration interest have led to the conception and development of the present amphibious, articulated marsh buggy or vehicle. This vehicle incorporates an articulating and oscillating double framework with quad pivoting pontoons and channel type cleats. The vehicle's frame or platform is segmented by individual front and rear drive units. This segmenting allows for articulation of the drive units about a vertical axis for steering and for oscillation about a longitudinal axis for better adjusting to uneven terrain. The four pontoons, two for each drive unit, are independently mounted on pivots and attached to the vehicle's frame. When one combines and incorporates these features into an amphibious marsh vehicle, the end result is an environmentally sensitive unit with greater maneuverability, stability and terrain hugging traction.

Steering the quad pontoon marsh vehicle is preferably achieved with hydraulic cylinders. Two steering cylinders are located at the pivotal connection between the drive units and are attached to the front and rear drive units. This is where the drive units are joined at the center articulating hinge point. Steering is controlled by the cylinders that cause the front and rear drive units to veer in the desired direction of travel. This feature offers better control and maneuverability with minimal environmental impact.

Each pontoon is buoyant and equipped with a continuous roller chain outfitted with elongated transverse cleats. Each chain is independently driven and is hydraulically driven by the vehicle's single engine preferably mounted on the frame or platform of the front drive unit. The cleats are used to reduce environmental damage caused by conventional tracks and provides the necessary traction required in marsh environments where one is often required to cross uneven terrain, such as levees, ridges, or steep embankments as those associated with canals, bayous, or rivers. The cleats are preferably formed of channel shaped plastic to eliminate the buildup of debris on the cleats.

Vehicle construction can be of steel, aluminum or any other suitable material. The vehicle is preferably powered by a single gasoline or diesel power unit. It should have a capability of climbing a grade of 60° or more. The vehicle can be outfitted with a manual transmission or hydrostatic drive system. Four pontoons, each with a continuous chain outfitted with cleats, are pivotally mounted independently on the front and rear drive units. The front and rear drive units are pinned and hinged preferably at the vehicle midsection articulating point. This articulating point or midsection of the vehicle is where the steering cylinders are mounted. Also incorporated into the midsection framework is structure that allows the units to oscillate about a longitudinal axis. Each pontoon is so connected to the drive units as to allow for independent pivotal or rocking movement by each of the pontoons about a transverse axis. Pontoon dimensions will vary and size can be determined by payload requirements and other factors.

Steering is controlled hydraulically, such as by a steering wheel connected to an orbital motor which in turn controls the two steering cylinders. The steering cylinders are mounted between the front and rear vehicle drive units at the articulating point. Turning the steering wheel allows for the extension of one cylinder while retracting the opposite cylinder. Such allows for turning the vehicle's front and rear frame section or drive unit in the desired direction of travel. Turning an amphibious vehicle in this fashion is far superior and less damaging to the environment than the conventional skidding method.

Each pontoon has its own chain drive driven by a hydraulic motor mounted on the inside rear of each pontoon. The pontoons' pivot point is preferably located at or adjacent the center of buoyancy, and each pontoon is independently attached to the vehicle's main frame. The pontoons ability to pivot is advantageous since it provides better surface contact between the vehicles' drive chain and cleats with the underlying terrain.

Historically, the previously described first and second generation marsh buggies have been the only type support equipment available to economically transport required equipment, personnel and supplies, into marsh and swamp areas. A marsh area could be defined as an environment that is boggy, saturated but not covered by water. Marsh areas also include, ecologically sensitive grassy lowlands with deep or shallow soft bottoms. A swamp is an area defined as above stated but is usually covered by water, infested with a thick or scattered growth of deeply rooted trees, and an area with a deep or shallow harder bottom.

The key element to increasing a vehicle's performance when traveling through such areas, is to maximize displacement of the vehicle's total weight and payload, equally and evenly, over the vehicle's drive chains where ground contact is made, thus spreading and decreasing ground pressure while maintaining maximum traction. The frame and pontoon flexibility, which are designed to better adapt to the terrain contour, however hard or soft, are key factors in minimizing ecological damage while decreasing ground pressure and maintaining maximum traction. These elements are paramount in eliminating slippage, which provides the vehicle with the greatest ability to make efficient headway in such environments.

Accordingly, an object of the present invention is to provide an articulating marsh buggy or vehicle that is amphibious and capable of efficient driving over all terrain and along and over water bodies, marshes, bayous and other environmental conditions encountered when transporting equipment, personnel or the like used in oil and gas exploration.

Another object of the invention is to provide a vehicle in accordance with the preceding object including front and rear drive units pivotally connected together for articulating movement about a vertical axis, preferably controlled by a pair of hydraulic piston and cylinder assemblies controllable from an operator's station for steering the vehicle in a desired direction.

A further object of the invention is to provide a vehicle in accordance with the preceding objects in which the front and rear units can oscillate about a longitudinal axis to enable the front and rear units to tilt in relation to each other.

Still another object of the invention is to provide a vehicle in accordance with the preceding objects in which each of the front and rear drive units includes a pair of buoyant pontoons pivotally connected to the drive units for independent pivotal movement about a transverse axis to enable the vehicle to traverse hills, valleys and other uneven terrain.

Yet another object of the invention is to provide a vehicle in accordance with the preceding objects in which each of the pontoons includes an independently driven endless chain in the form of a roller chain that is in contact with the periphery of the pontoon generally at the center thereof. Each chain includes a plurality of unique channel shaped plastic cleats extending across the width of the pontoon and being driven at the rear end thereof by a hydraulic motor and planetary reduction gear unit for independently controlling the driving characteristics of the chain and cleats on each pontoon.

Still another object of the present invention is to provide an amphibious articulated marsh buggy or vehicle in accordance with the preceding objects which enables the vehicle to traverse various environmental areas without endangering sensitive vegetation, river or bayous banks, water bottoms and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
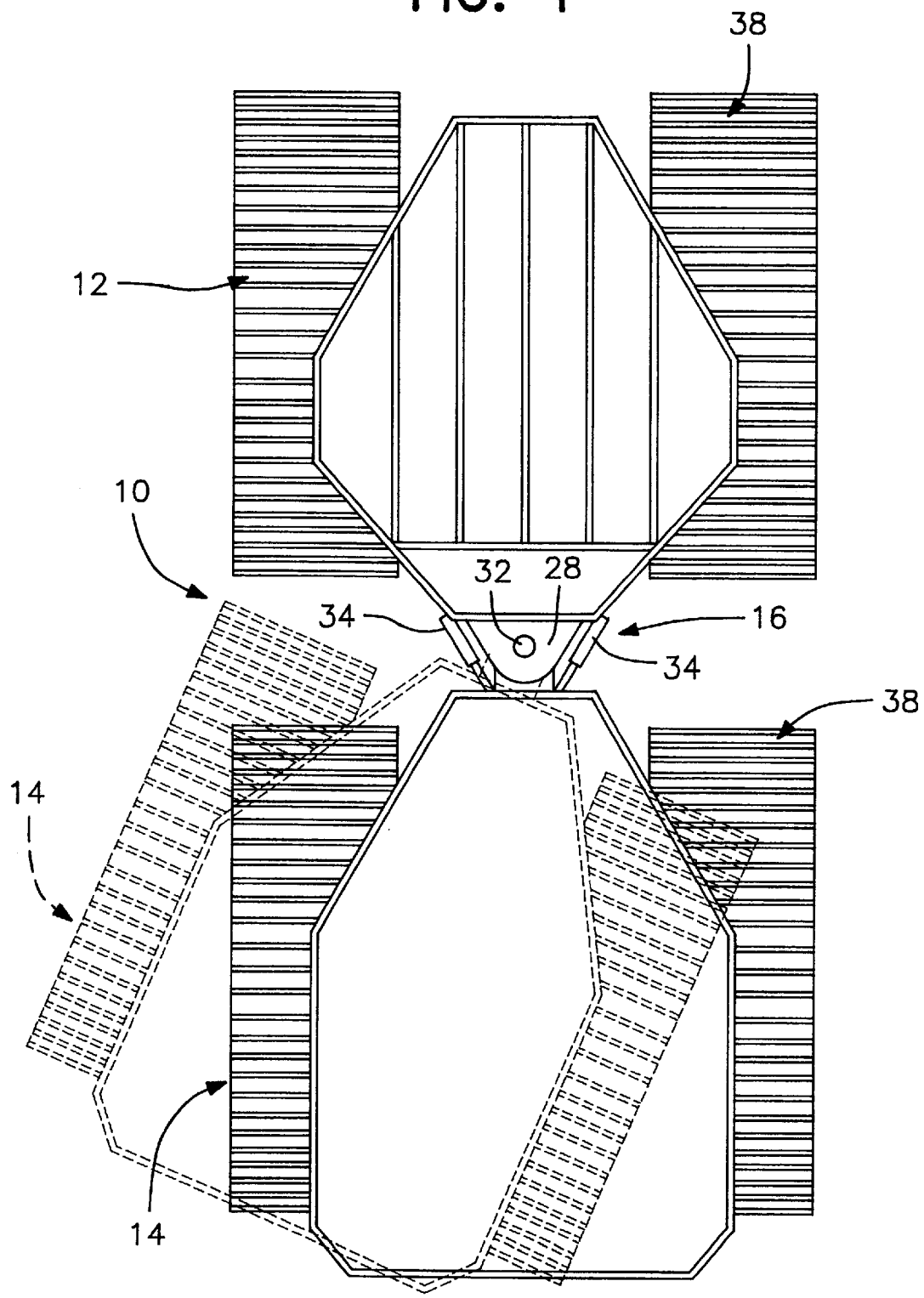
FIG. 1 is a top plan view of the preferred articulating marsh buggy of the present invention illustrating the steering capability of the segment frame forming the front and rear drive units.

Although only one preferred embodiment of the invention is explained in detail, it is to be understood that the invention is not limited in its scope to the details of construction and the arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 2:
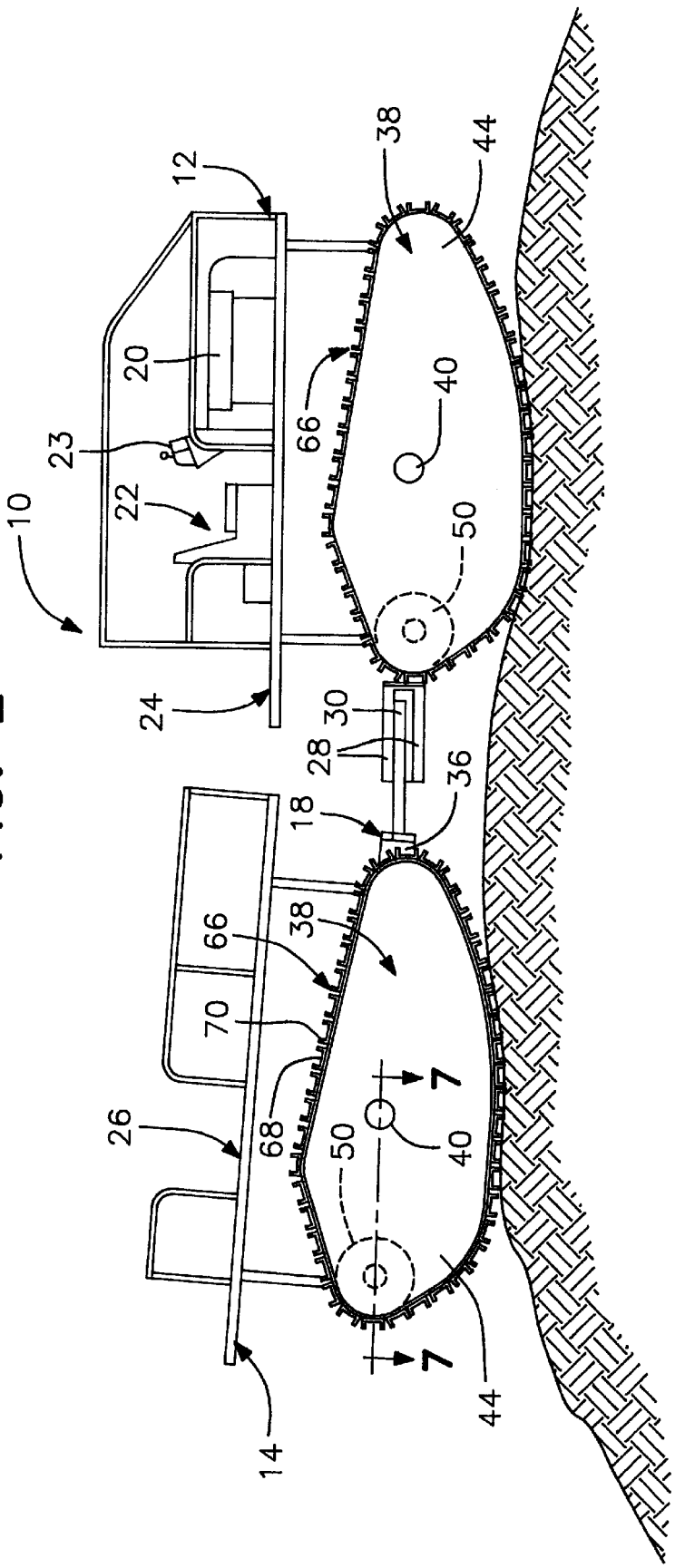
FIG. 2 is a side elevational view of the marsh buggy of FIG. 1.
Figure 3:
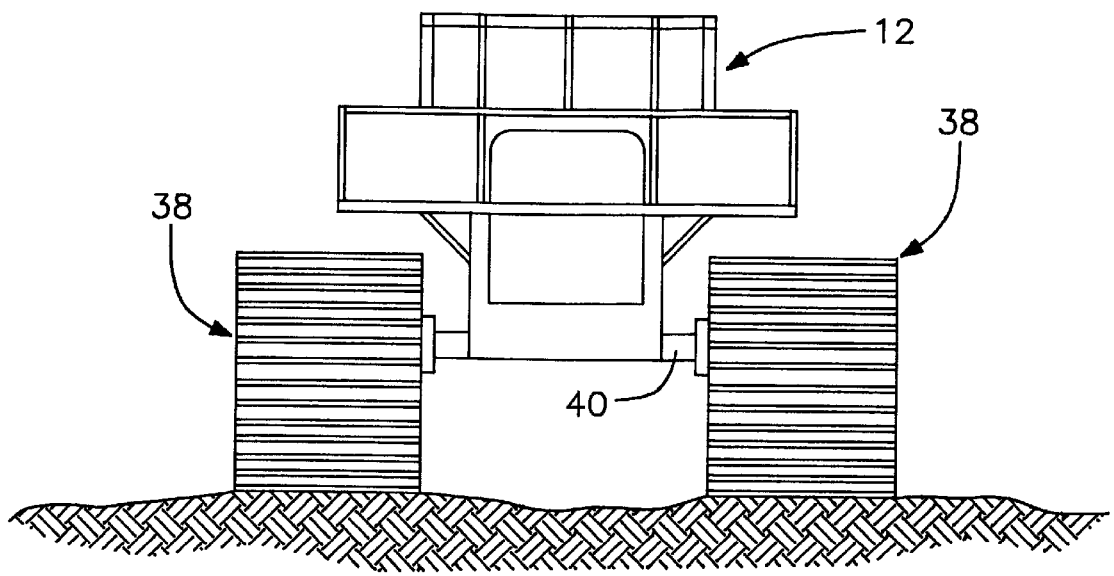
FIG. 3 is an end elevational view of the marsh buggy of FIG. 1.

The articulating marsh buggy or vehicle of the present invention is generally designated by reference numeral 10 and includes a front drive unit or frame section 12 which may be considered the control unit and a rear drive unit or frame section 14 which may be considered the transport unit. The units 12 and 14 are articularly connected together by a controlled vertical pivotal connection generally designated by reference number 16. The units 12 and 14 are also connected by an oscillating connection generally designated by reference numeral 18 which enables the units 12 and 14 to oscillate or pivot about a longitudinal axis. As illustrated in FIG. 2, the front unit 12 is provided with a power unit 20 and an operator station generally designated by reference numeral 22. Also, each unit is provided with a frame structure generally designated by numeral 24 in the front unit 12 and 26 in the rear unit 14.

The articulate connection 16 includes upper and lower plates 28 on the front unit and a central plate 30 on the rear unit sandwiched between the plates 28 and interconnected by a pin 32. As such, the front and rear units 12 and 14 are pivotally interconnected for articulating movement about a vertical axis defined by pivot pin 32. A pair of hydraulically controlled piston and cylinder assemblies 34 (see FIG. 1) interconnect the frames of the front and rear units on opposite sides of the pivot pin 32. Thus, by extension and retraction of the piston and cylinder assemblies 34, the front unit 12 and the rear unit 14 can be steered in a desired direction by pivoting the units relative to each other about the center pivot pin 32 in a manner illustrated in dashed lines on FIG. 1.

Figure 4:
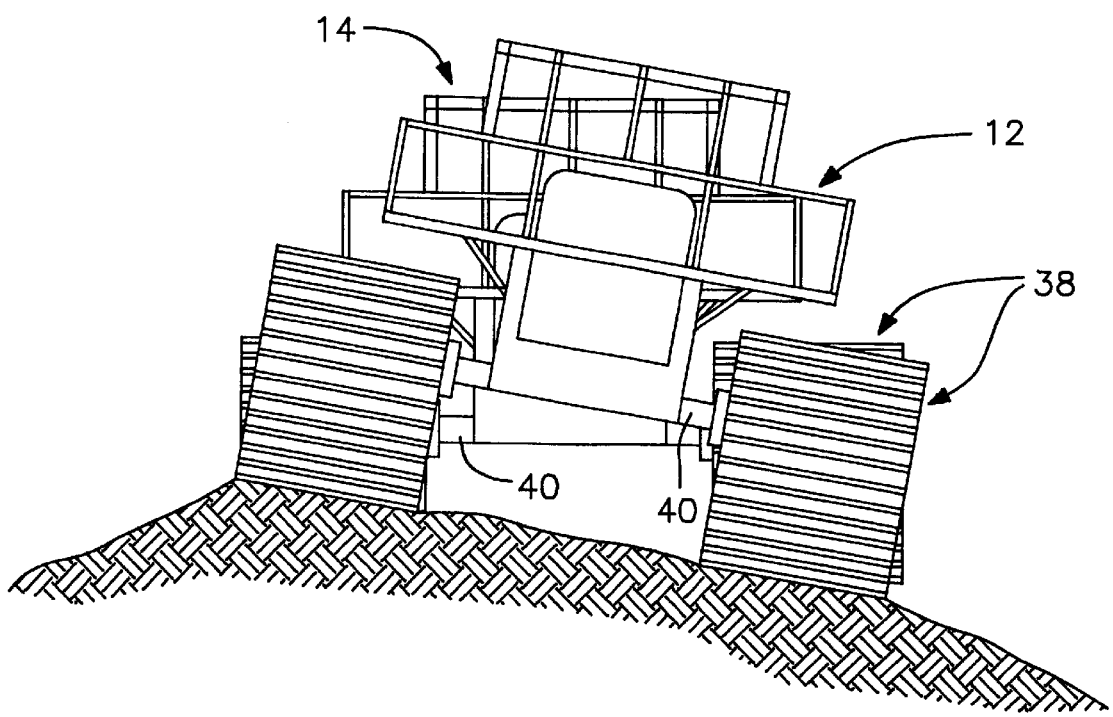
FIG. 4 is an end elevational view similar to FIG. 3, but illustrating the manner in which one of the drive units can oscillate about a longitudinal axis in relation to the other.
Figure 5:
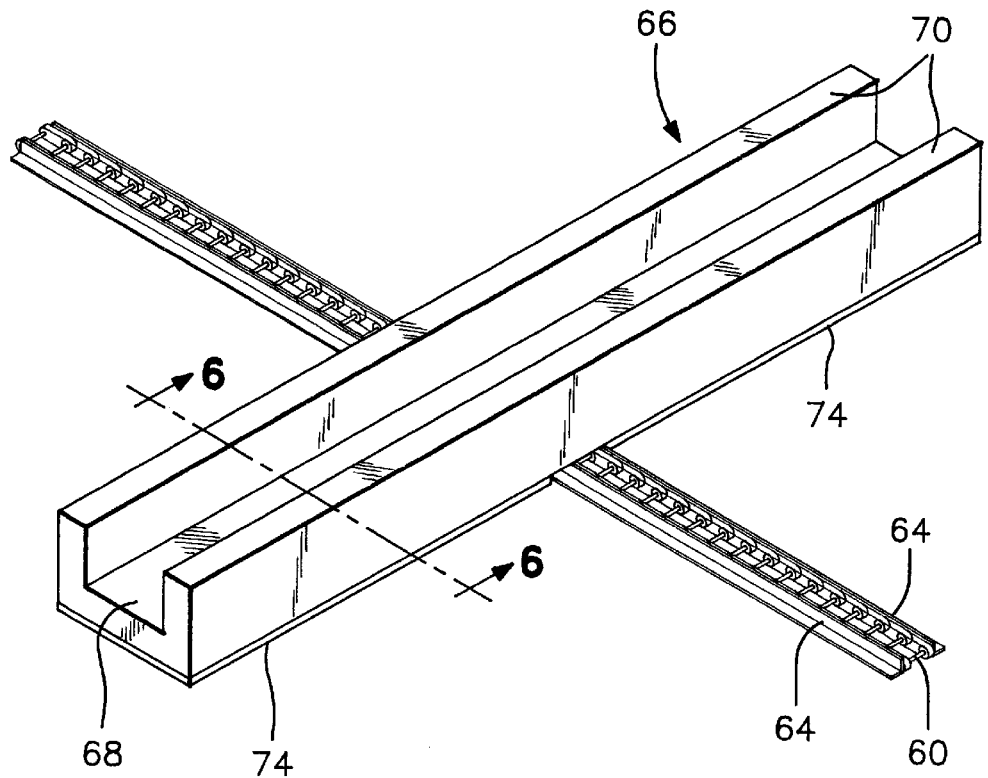
FIG. 5 is a schematic illustration of a driving chain and cleat assembly utilized on each pontoon in accordance with the present invention.

The oscillating connection 18 includes a swivel connection 36 interconnecting the rearward unit with the articulate connection 16 to enable the front unit 12 and the rear unit 14 to oscillate or pivot about a longitudinal axis in relation to each other as illustrated in FIG. 4.

Each of the front and rear units includes a pair of floatation pontoons 38 with each of the pontoons 38 being connected to the frame of the front or rear units by a supporting pivot shaft 40 which extends through the pontoon and is supported thereon by bearing structures 42. The inner end of each shaft 40 is rigidly affixed to the frame section of the unit on which the pontoon is mounted. Orienting the support shaft 40 and enabling free pivotal movement of the pontoon adjacent or at its center of buoyancy enables the pontoons to pivot about a transverse axis independent of each other and independent of control so that the pontoons can orient themselves in a position for optimum engagement with a supporting surface or optimum floating engagement with a water surface.

Figure 6:
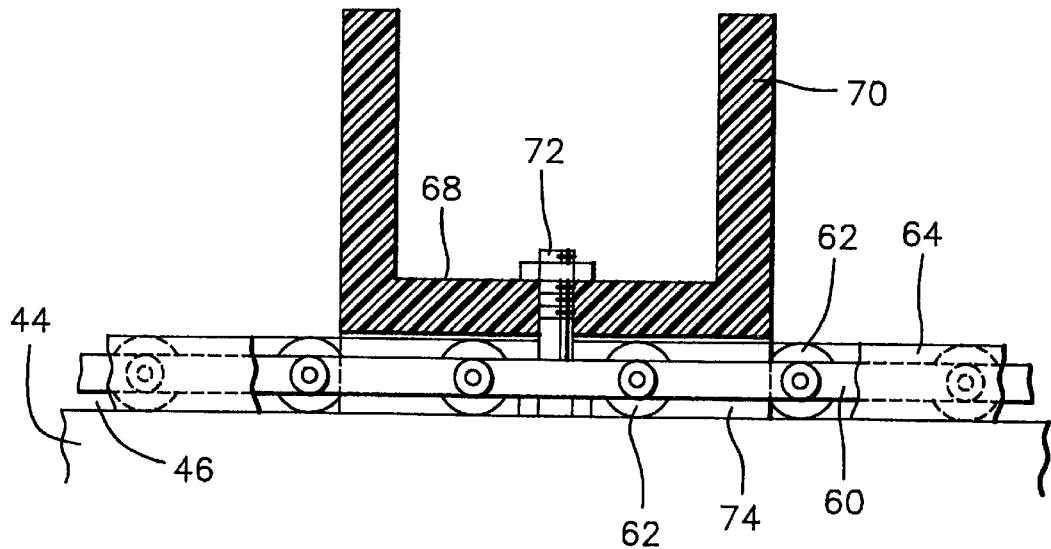
FIG. 6 is a transverse, sectional view taken substantially upon a plane passing along section line 6—6 on FIG. 5 illustrating the structural details of the drive chain and cleat mounted thereon.
Figure 7:
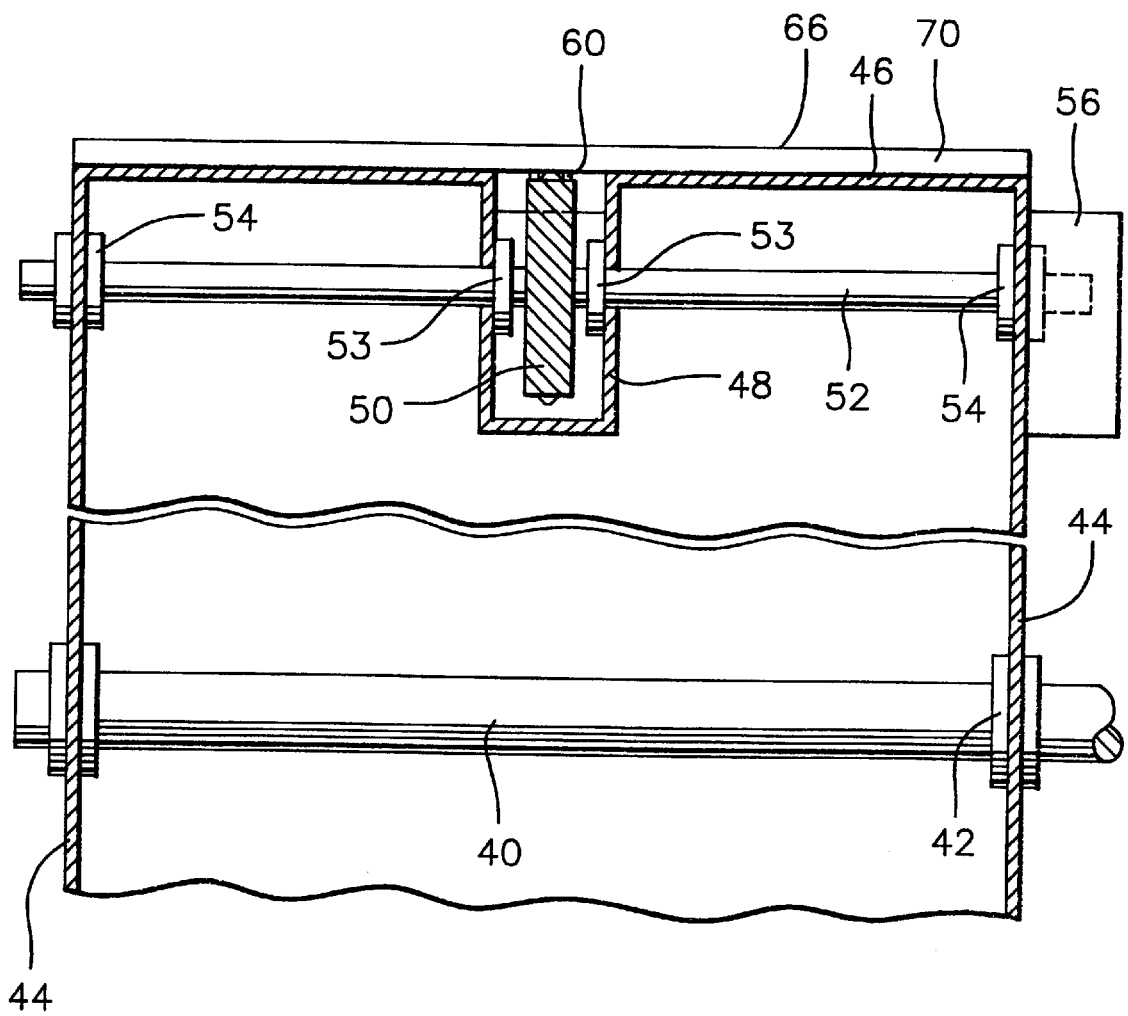
FIG. 7 is a longitudinal sectional view taken substantially upon a plane passing along section line 7—7 on FIG. 2 illustrating the drive sprocket in relation to the drive chain and cleats as well as the pivotal support for each pontoon.

As illustrated in FIG. 7, the pontoons 38 have the same general size and construction. However, it will be understood that the size and construction can vary as desired. Each pontoon 38 includes side walls 44 and a peripheral wall 46 with the shaft 40 being journaled from bearings 42 fixed to the side walls 44. As illustrated in FIG. 2, the pontoons are elongated from front to rear and have a straight or downwardly bowed lower peripheral wall and a straight or upwardly bowed upper peripheral wall and rounded end walls. At the rear of each pontoon, the peripheral wall 46 is provided with an inwardly extending recess 48 which receives a sprocket 50 mounted on a transversely extending shaft 52. The shaft 52 is journaled in bearings 54 in the side walls 44 of the pontoon 38 and bearings 53 in the walls of the sprocket recess 48. The shaft 52 is driven by a hydraulic motor and planetary reduction gear unit 56. The sprocket 50 engages a roller sprocket endless chain 60 which includes rollers 62 on the pins which connect the chain links. The rollers in chain 60 are in rolling contact with the peripheral wall 46 of the pontoon as illustrated in FIG. 6 and is guided along the center of the pontoon by right angled guide flanges 64 secured to the peripheral wall 46 of the pontoon 38. The flanges 64 thereby maintain the sprocket chain 60 along the longitudinal center of the peripheral wall of the pontoon.

Attached to the sprocket chain 60 are a plurality of elongated cleats generally designated by reference numeral 66. Each cleat 66 is designed to include a generally U-shaped member having a web or bight portion 68 and a pair of parallel outwardly extending flanges 70. Each U-shaped or channel shaped cleat 66 preferably extends in transverse, perpendicular relation to the sprocket chain 60 and generally substantially across the entire width of the peripheral wall 46 of the pontoon 38. The web 68 of the cleat 60 is secured to the sprocket chain 60 and spaced above rollers 62 by a fastening bolt or other fastening device 72 which secures the cleat in perpendicular relation to the sprocket chain.

Each end portion of the cleat 66 outwardly of the sprocket chain is provided with a plastic wear strip 74 which engages the surface of the pontoon wall 46 to enable the cleat to slide along the surface of the peripheral wall during the linear movement of the sprocket chain 60 around the periphery of the wall 46. The rollers 62 on the sprocket chain 60 engaging the peripheral wall 46 of the pontoon 38 also reduces frictional drag of the chain along the surface of the pontoon inasmuch as the rollers 62 space the links of the chain 60 from the surface of the peripheral wall 46 of the pontoon 38. The plastic wear strips 74 may be continuous outwardly of the guide flanges 64 or may be spaced segments along each side edge of the bottom surface of the web 68 of the cleat 66. The cleats 66 are preferably constructed of polyurethane or equivalent plastic or other material which together with the cleat design minimizes environmental damage during movement of the vehicle in ecologically sensitive areas. The plastic material and design of the cleats 66 are also intended to avoid buildup of debris on the cleats and pontoons. The wear strips 74 are also preferably constructed of plastic or other material having greater wear resistance than the cleat and may be replaceable by easy removal of the cleat 66 by releasing the fastener 72. The guide flanges 64 engaging the inner ends of the strips 74 maintain the cleats 66 in perpendicular relation to the chain 60 and the side walls 44 of the pontoon 38.

The recess or notch 48 in the rearward nose of the peripheral wall 46 of each pontoon is centrally located and is secured as by welding or the like to peripheral wall 46 so as to maintain the waterproof integrity of the interior of the pontoon so that the pontoon retains its floatation characteristics. The bearings 54 and 42, as well as bearings 53 which support the shaft 52 in the walls of the notch 48, all include seal structures which also maintain the water tight integrity of the interior of the pontoon.

The drive chain 60 is maintained in a taut condition by any suitable slack take up mechanism such as an adjustable idler sprocket or slotted mounting of the drive shaft bearings while maintaining watertight integrity of each pontoon.

Each of the hydraulic motors 56 are driven from a single pump providing hydraulic pressure through controls 23 at the operator's station for independently driving each of the sprocket chains 60 in a forward or reverse direction at variable speeds as controlled by the operator of the marsh buggy or vehicle.

The quad pontoon marsh buggy or vehicle is steered by the pair of steering cylinders 34 attached between the forward and rear units 12 and 14 on opposite sides of the articulating vertical axis hinge point formed by pivot pin 32. Expanding and contracting the cylinders 34 by using a steering control (not shown) at the operator station 22 causes the front and rear frame units to veer in the desired direction of travel which provides better control and maneuverability with minimal environmental impact as compared to marsh buggies or vehicles equipped with an endless track at each side which controls steering by stopping one track while driving the other track which produces a skidding effect due to the weight of the vehicle and the drag resistance of the stopped or locked drive track. This latter type steering is detrimental to ecologically sensitive areas where tender vegetation and loose root structures exist.

The four pontoons are independently mounted on the support shafts 40 for independent pivotal movement about the transverse axis of the shafts 40. Each pontoon 38 is buoyant to enable amphibious movement of the marsh vehicle through various types of terrain including undulating terrain over ground surfaces and through water bodies either in engagement with the water bottom or floated above the water bottom and movement into or from water bodies by descending or ascending the banks and adjacent surfaces of the water body. The pivotal movement of the pontoons enables them to independently pivot for optimum engagement of the drive cleats 66 with a water surface or land surface which provides optimum traction with minimum destruction of vegetation, minimum damage to the bottom of the water body and minimum damage to the banks of water bodies and soil surfaces engaged by the cleats. Thus, the articulating marsh vehicle can effectively traverse uneven terrain such as levies, ridges or steep embankments such as those associated with canals, bayous, swamps, rivers and the like. The floatation characteristics of the pontoons also enables maximum displacement of the total weight of the vehicle and payload equally and evenly over the vehicle drive chains and pontoons in contact with the ground surface thereby spreading and decreasing ground pressure while maintaining maximum traction. The construction of the cleats 66 enables effective driving force to be exerted on the vehicle during floatation of the vehicle in relation to a body of water. The pivotal movement of the front and rear units about a longitudinal axis enables unrestricted oscillating movement of the front unit in relation to the rear unit about a longitudinal axis to enable efficient contact of the drive cleats with ground surfaces having different angles of inclination transversely of the path of movement of the vehicle thus maintaining maximum ground traction.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An articulating marsh buggy capable of amphibious movement over ground surfaces having various terrain characteristics and water bodies, said buggy including a front frame section and a rear frame section, a pivot connection between said frame sections to enable relative pivotal movement therebetween about a generally vertical axis to enable steering control of the buggy, a longitudinally extending pivot connection between the frame sections to enable relative tilting movement of the frame sections about a generally longitudinal axis, each of said front and rear frame sections including a pair of longitudinally extending side mounted pontoons having floatation characteristics, a support independently pivotally mounting each of said pontoons to said frame sections for independent pivotal movement about an axis generally transverse of the buggy, each of said pontoons including a cleated drive and drive unit for moving the buggy over ground surfaces and water bodies.

2. The buggy as defined in claim 1 wherein each of said pontoons is elongated longitudinally of the frame sections and includes rounded forward and rearward ends, said cleated drive including a drive chain oriented around a periphery of the pontoon and located centrally of the transverse width of the pontoon, each of said pontoons being pivotally supported approximately at a center of buoyancy of the pontoon.

3. The buggy as defined in claim 2 wherein the periphery of each pontoon is provided with a pair of outwardly extending, transversely spaced guide flanges extending around the periphery of the pontoon for guiding movement of the drive chain around the periphery of the pontoon.

4. The buggy as defined in claim 3 wherein said drive chain is a roller chain with the rollers having a periphery extending beyond the inner surface of the drive chain and in rolling contact with the periphery of the pontoon to reduce frictional drag of the chain in relation to the pontoon.

5. The buggy as defined in claim 4 wherein said cleated drive includes a drive chain on each pontoon, a plurality of equally spaced, transversely extending drive cleats mounted on said drive chain in generally perpendicular relation thereto and extending substantially throughout the width of the pontoon.

6. The buggy as defined in claim 5 wherein each cleat includes a transverse channel shaped configuration including a web attached to the chain and a pair of generally parallel outwardly extending flanges, said cleats being constructed of plastic material to reduce adherence of vegetation and mud to the cleat thereby minimizing environmental damage to surfaces being traversed.

7. An articulating marsh buggy capable of amphibious movement over ground surfaces having various terrain characteristics and water bodies, said buggy including a front drive unit and a rear drive unit, a pivot connection between said units to enable relative pivotal movement therebetween about a generally vertical axis to enable steering control of the buggy, a longitudinally extending pivot connection between the units to enable relative tilting movement of the units about a generally longitudinal axis, each of said front and rear units including a pair of side mounted pontoons having floatation characteristics, each of said pontoons including a cleated drive and drive unit for moving the buggy over ground surfaces and water bodies, said cleated drive including a drive chain on each pontoon, a plurality of equally spaced, transversely extending drive cleats mounted on said drive chain in generally perpendicular relation thereto and extending substantially throughout the width of the pontoon, each cleat including a web attached to the chain and a pair of generally parallel outwardly extending flanges and being constructed of plastic material, each of said cleats further including a strip along an inner surface of the web extending laterally outwardly from both sides of the drive chain for engaging the periphery of the pontoon to maintain the drive cleat in generally parallel relation to the peripheral surface of the pontoon.

8. The buggy as defined in claim 7 wherein the periphery of each pontoon is provided with a pair of outwardly extending, transversely spaced guide flanges extending around the periphery of the pontoon for guiding movement of the drive chain around the periphery of the pontoon.

9. The buggy as defined in claim 8 wherein said drive chain is a roller chain with the rollers having a periphery extending beyond the inner surface of the drive chain and in rolling contact with the periphery of the pontoon to reduce frictional drag of the chain in relation to the pontoon.

10. The buggy as defined in claim 7 wherein one end of each of said pontoons includes an inwardly extending water tight recess, a drive shaft extending transversely of the pontoon and through the recess in water tight relation to the pontoon, a chain drive sprocket mounted on said shaft within the recess in driving engagement with the chain, and a power unit connected to an end of said drive shaft for driving said chain.

11. The buggy as defined in claim 10 wherein said power unit includes a hydraulic motor and reduction gear unit connected to an inner end of said drive shaft, the hydraulic motor on each pontoon being connected independently to a hydraulic power system on one of said units for independent movement of said drive chains at varying speeds and in forward or reverse directions.

12. The buggy as defined in claim 11 wherein said front unit includes an operator station, a prime mover and hydraulic pump, and controls for driving the drive chains at selected speeds and directions.

13. In an amphibious vehicle adapted to traverse uneven terrain and water bodies with minimum damage to surfaces being traversed, the improvement comprising a pontoon assembly comprising a pair of elongated, generally parallel, watertight pontoons oriented in transversely spaced relation and supported from the vehicle for independent, free pivotal movement about a generally transverse axis between forward and rearward ends thereof, and an independent drive assembly mounted on each pontoon, each drive assembly including a flexible drive chain encircling and engaging a peripheral surface of the pontoon, traction members mounted on said chain and a power unit mounted on the pontoon in driving engagement with said drive chain for propelling the vehicle over all terrain surfaces and water bodies.

14. The vehicle as defined in claim 13 wherein said drive chain is oriented centrally between side edges of the pontoon, said drive chain being a sprocket chain, said power unit being a motor mounted exteriorally on the pontoon and driving a drive sprocket oriented exteriorally of the pontoon and in driving engagement with said drive chain to maintain watertight integrity of the pontoon.

15. The vehicle as defined in claim 14 wherein each pontoon is provided with peripheral guide flanges guiding movement of the drive chain.

16. The vehicle as defined in claim 15 wherein each of said traction members includes a transversely extending channel shaped cleat having a length generally equal to the width of the pontoon.

17. A marsh buggy capable of amphibious movement over ground surfaces having various terrain characteristics and water bodies, which comprises a front unit and a rear unit interconnected to enable relative pivotal movement therebetween about a generally vertical axis for steering control of the buggy and relative oscillating movement therebetween about a generally longitudinal axis for traversing uneven surfaces, while minimizing environmental damage to surfaces being traversed by the vehicle, each of said front and rear units including a pair of laterally spaced sealed pontoons for providing flotation of said buggy in a water body, and each of said pontoons having a moving tread driven over the outer periphery of said pontoon for moving the buggy over ground surfaces and water bodies.

18. The buggy as defined in claim 2 wherein one end of each of said pontoons includes an inwardly extending water tight recess, a drive shaft extending transversely of the pontoon and through the recess in water tight relation to the pontoon, a chain drive sprocket mounted on said shaft within the recess in driving engagement with the chain, and a power unit connected to an end of said drive shaft for driving said chain.

19. The buggy as defined in claim 5 wherein one end of each of said pontoons includes an inwardly extending water tight recess, a drive shaft extending transversely of the pontoon and through the recess in water tight relation to the pontoon, a chain drive sprocket mounted on said shaft within the recess in driving engagement with the chain, and a power unit connected to an end of said drive shaft for driving said chain.

20. The marsh buggy as defined in claim 17 wherein each of said pontoons on each of said front and rear units being independently pivotally supported from said front and rear units for independent pivotal movement about an axis generally transverse of the front and rear units.

* * * * *